US012772086B2

(12) United States Patent
Cao et al.

(10) Patent No.: US 12,772,086 B2
(45) Date of Patent: Oct. 20, 2026

(54) ASSISTANCE INFORMATION IN WIRELESS COMMUNICATIONS

(71) Applicant: ZTE CORPORATION, Shenzhen (CN)

(72) Inventors: Wei Cao, Shenzhen (CN); Nan Zhang, Shenzhen (CN); Jianwu Dou, Shenzhen (CN); Chenchen Zhang, Shenzhen (CN); Jianqiang Dai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 485 days.

(21) Appl. No.: 18/189,602

(22) Filed: Mar. 24, 2023

(65) Prior Publication Data

US 2023/0337035 A1 Oct. 19, 2023

Related U.S. Application Data

(63) Continuation of application No. PCT/CN2020/120940, filed on Oct. 14, 2020.

(51) Int. Cl.
*H04W 24/10* (2009.01)
*H04W 24/02* (2009.01)

(52) U.S. Cl.
CPC ........... *H04W 24/10* (2013.01); *H04W 24/02* (2013.01)

(58) Field of Classification Search
CPC ..... H04W 24/02; H04W 24/08; H04W 24/10; H04W 36/0088; H04W 84/06; Y02D 30/70
See application file for complete search history.

(56) References Cited

U.S. PATENT DOCUMENTS

| | | | | |
|---|---|---|---|---|
| 9,301,180 | B2 * | 3/2016 | Suzuki | H04B 7/18563 |
| 9,326,263 | B2 * | 4/2016 | Fix | H04W 64/00 |
| 10,551,480 | B2 * | 2/2020 | Modarres Razavi | G01S 5/0036 |
| 11,743,755 | B2 * | 8/2023 | Huang | H04W 84/06 370/329 |
| 12,133,189 | B2 * | 10/2024 | Hajir | H04W 56/006 |
| 2019/0049550 | A1 * | 2/2019 | Modarres Razavi | H04W 24/10 |
| 2019/0094977 | A1 * | 3/2019 | Ishihara | G06F 3/017 |
| 2020/0153500 | A1 | 5/2020 | Kim et al. | |
| 2020/0267681 | A1 * | 8/2020 | Ferrari | H04W 64/00 |
| 2020/0305017 | A1 | 9/2020 | Zhang et al. | |
| 2021/0242934 | A1 * | 8/2021 | Qiao | H04B 7/185 |
| 2021/0376915 | A1 * | 12/2021 | Mahalingam | H04W 16/28 |
| 2022/0030532 | A1 * | 1/2022 | Hajir | H04B 7/18513 |

(Continued)

FOREIGN PATENT DOCUMENTS

| | | | | |
|---|---|---|---|---|
| EP | 3694123 | A1 * | 8/2020 | H04J 11/0069 |
| EP | 3 910 993 | A1 | 11/2021 | |

(Continued)

OTHER PUBLICATIONS

International Search Report and Written Opinion for PCT Appl. No. PCT/CN2020/120940, mailed Jul. 2, 2021 (8 pages).

(Continued)

*Primary Examiner* — Eric Nowlin
(74) *Attorney, Agent, or Firm* — Foley & Lardner LLP

(57) ABSTRACT

A wireless communication method for use in a wireless terminal is disclosed. The method comprises receiving, from a wireless network node, assistance information associated with a serving cell of the wireless terminal, and disabling at least one measurement based on the assistance information.

19 Claims, 7 Drawing Sheets

(56) References Cited

U.S. PATENT DOCUMENTS

| | | | | |
|---|---|---|---|---|
| 2022/0225132 | A1* | 7/2022 | Roy | H04B 7/18513 |
| 2022/0279404 | A1* | 9/2022 | Wakabayashi | H04B 7/18504 |
| 2023/0109017 | A1* | 4/2023 | Huang | H04W 24/10 370/329 |
| 2024/0031886 | A1* | 1/2024 | Li | H04W 56/001 |
| 2024/0056919 | A1* | 2/2024 | Li | H04B 7/18541 |
| 2025/0056255 | A1* | 2/2025 | Fu | H04W 24/02 |
| 2025/0081060 | A1* | 3/2025 | Li | H04W 36/0094 |
| 2025/0193762 | A1* | 6/2025 | Zhong | H04W 36/32 |

FOREIGN PATENT DOCUMENTS

| | | | |
|---|---|---|---|
| EP | 3 952 444 | A1 | 2/2022 |
| EP | 4 224 927 | A1 | 8/2023 |
| KR | 10-2020-0086623 | A | 7/2020 |
| WO | WO-2018/209247 | A | 11/2018 |
| WO | WO-2020/076220 | A1 | 4/2020 |
| WO | WO-2020/148582 | A1 | 7/2020 |
| WO | WO-2020/163610 | A1 | 8/2020 |
| WO | WO-2020/182006 | A1 | 9/2020 |

OTHER PUBLICATIONS

Nokia et al., "Discussion on introduction of additional SRS symbols", 3GPP TSG RAN WG1 Meeting #99, R1-1912655, Nov. 22, 2019, Reno, USA (5 pages).

Extended European Search Report for EP Appl. No. 20957062.1, dated Apr. 23, 2024 (13 pages).

Mediatek USA Inc., "Improving Cell Reselection using Next Cell Information in NTN", 3GPP TSG-RAN WG2 Meeting #107-Bis, Tdoc R2-1912655, Oct. 18, 2019, Chongqing, China (3 pages).

Third Office Action for CN Appl. No. 202411323562.X, dated Sep. 23, 2025 (with English translation, 12 pages).

Decision of Rejection for CN Appl. No. 202411323562.X, dated Jan. 13, 2026 (with English translation, 10 pages).

Second Office Action for CN Appl. No. 202411323562.X, dated Jun. 27, 2025 (with English translation, 6 pages).

First Office Action for CN Appl. No. 202411323562.X, dated Mar. 21, 2025 (with English translation, 21 pages).

* cited by examiner

ASSISTANCE INFORMATION IN WIRELESS COMMUNICATIONS

This application is a continuation of PCT/CN2020/120940, filed Oct. 14, 2020, the content of which is incorporated herein by reference in its entirety.

TECHNICAL FIELD

This document is directed generally to wireless communications.

BACKGROUND

To expand the utilization of new radio (NR) access technologies, connectivity via satellites and/or airborne vehicles has been considered as a promising application. A network incorporating the satellites and/or airborne vehicles to perform the functions (either full or partial) of terrestrial base stations (BSs) is called a non-terrestrial network (NTN).

SUMMARY

In NTNs, transparent payload is a common choice for a low complexity satellite. That is, the satellite has a grounded BS (e.g. gNB) for serving an area in a one-hop manner. Thus, it is reasonable to set a fixed service area on Earth for each BS. In such conditions, the transparent payload satellite is regarded as a remote radio head (RRH) of the BS. The satellite may use a steerable beam to cover a given area in the whole coverage of the BS.

For the satellite using a steerable beam, a shape of a footprint of the satellite changes with the movement of the satellite. To guarantee seamless coverage, an overlapped area of two neighboring satellites may be very large. In such a condition, unnecessary measurements at UE side and/or frequent switches among satellites become possible and may consume high power/signaling cost.

Thus, how to avoid unnecessary measurements and/or link switches, e.g., in the NTN, becomes a topic to be discussed.

This document relates to methods, systems, and devices associated with transmitting/receiving assistance information in wireless communications.

The present disclosure relates to a wireless communication method for use in a wireless terminal. The method comprises receiving, from a wireless network node, assistance information associated with a serving cell of the wireless terminal, and disabling at least one measurement based on the assistance information.

Various embodiments may preferably implement the following features:

Preferably or in some implementations, the assistance information comprises at least one of a serving time interval, an ephemeris of an airborne platform or a flying platform of the serving cell, a location of a reference point, a distance threshold corresponding to the serving cell, an elevation angle from the reference point to the airborne platform or the flying platform of the serving cell, an elevation threshold corresponding to the serving cell, or a propagation delay between the wireless terminal and the wireless network node.

Preferably or in some implementations, the assistance information comprises the serving time interval, and the disabling the at least one measurement based on the assistance information comprises disabling the at least one measurement during the serving time interval.

Preferably or in some implementations, the assistance information comprises the serving time interval, the location of the reference point and the distance threshold corresponding to the serving cell and the disabling the at least one measurement based on the assistance information comprises disabling the at least one measurement during the serving time interval when a distance between the reference point and the wireless terminal is smaller than the distance threshold.

Preferably or in some implementations, the serving time interval is adjusted by the propagation delay between the wireless terminal and the wireless network node.

Preferably or in some implementations, the assistance information comprises the propagation delay.

Preferably or in some implementations, the assistance information comprises the ephemeris of the airborne platform or the flying platform of the serving cell and the wireless terminal determines the propagation delay based on the ephemeris of the airborne platform or the flying platform of the serving cell.

Preferably or in some implementations, the assistance information comprises the elevation threshold and the disabling the at least one measurement based on the assistance information comprises disabling the at least one measurement when the elevation angle between the reference point and the airborne platform or the flying platform of the serving cell is greater than the elevation threshold.

Preferably or in some implementations, the assistance information comprises the elevation angle between the reference point and the airborne platform or the flying platform of the serving cell.

Preferably or in some implementations, the assistance information comprises the ephemeris of the airborne platform or the flying platform of the serving cell and the location of the reference point and the wireless terminal determines the elevation angle between the reference point and the serving cell based on the ephemeris of the airborne platform or the flying platform of the serving cell and the location of the reference point.

Preferably or in some implementations, the at least one measurement is associated with at least one of a handover procedure, a radio link failure or a beam management procedure.

Preferably or in some implementations, the at least one measurement comprises at least one of receiving at least one reference signal of the at least one measurement, monitoring at least one reference signal of the at least one measurement, calculating at least one measurement result of the at least one measurement, reporting at least one measurement result of the at least one measurement, or triggering at least one measurement event.

Preferably or in some implementations, the wireless communication method further comprises receiving, from the wireless network node, an indication of disabling the at least one measurement based on the assistance information.

The present disclosure relates to a wireless communication method for use in a wireless terminal. The method comprises:

- receiving, from a wireless network node, assistance information associated with a serving cell of the wireless terminal, and
- adjusting a measurement configuration of performing at least one measurement based on the assistance information.

Various embodiments may preferably implement the following features:

Preferably or in some implementations, the assistance information comprises at least one of at least one time offset between a propagation delay of the serving cell and each of at least one propagation delay of at least one neighboring cell, at least one frequency gap between a Doppler shift of the serving cell and each of at least one Doppler shift at least one neighboring cell, a location of a reference point, a distance threshold corresponding to the serving cell, a serving time interval of the serving cell of the wireless terminal, an adjustment triggering time of adjusting the measurement configuration, a plurality of periods corresponding to a measurement gap of performing the at least one measurement, or a propagation delay between the wireless terminal and the wireless network node.

Preferably or in some implementations, the assistance information comprises the at least one time offset and the adjusting the measurement configuration of performing the at least one measurement based on the assistance information comprises adjusting a starting time of a measurement gap by the time offset corresponding to one of the at least one neighboring cell for performing the at least one measurement corresponding to the one of the at least one neighboring cell.

Preferably or in some implementations, the assistance information comprises the distance threshold corresponding to the serving cell and the plurality of periods corresponding to the measurement gap of performing the at least one measurement and the adjusting the measurement configuration of performing the at least one measurement based on the assistance information comprises:

adjusting a period of the measurement gap of performing the at least one measurement to a first period in the plurality of periods when a distance between the wireless terminal and the reference point is smaller than the distance threshold, and adjusting the period of the measurement gap of performing the at least one measurement to a second period in the plurality of periods when the distance between the wireless terminal and the reference point is greater than or equal to the distance threshold, and wherein the first period is greater than the second period.

Preferably or in some implementations, the assistance information further comprises the distance between the wireless terminal and the reference point.

Preferably or in some implementations, the assistance information comprises the location of the reference point and the wireless terminal determines the distance between the wireless terminal and the reference point based on the location of the reference point.

Preferably or in some implementations, the assistance information comprises the adjustment triggering time of adjusting the measurement configuration and the adjusting the measurement configuration of performing the at least one measurement based on the assistance information comprises:

adjusting a period of the measurement gap of performing the at least one measurement to a first period before the adjustment triggering time, and adjusting the period of the measurement gap of performing the at least one measurement to a second period after the adjustment triggering time, wherein the first period is greater than the second period.

Preferably or in some implementations, the adjustment triggering time is adjusted by the propagation delay between the wireless terminal and the wireless network node.

Preferably or in some implementations, the assistance information further comprises the propagation delay.

Preferably or in some implementations, the assistance information comprises an ephemeris of an airborne platform of or a flying platform of the serving cell and the wireless terminal determines the propagation delay based on the ephemeris of the airborne platform or the flying platform of the serving cell.

Preferably or in some implementations, the at least one measurement comprises at least one synchronization based measurement or at least one synchronization signal block, SSB, measurement.

The present disclosure relates to a wireless communication method for use in a wireless terminal. The method comprises:

receiving, from a wireless network node, assistance information associated with a serving cell of the wireless terminal, and delaying at least one signal communication based on the assistance information.

Various embodiments may preferably implement the following features:

Preferably or in some implementations, the assistance information comprises at least one of a serving time interval, an initial time of delaying the at least one signal communication based on the assistance information, an ephemeris of an airborne platform or a flying platform of the serving cell, or a propagation delay between the wireless terminal and the wireless network node.

Preferably or in some implementations, the assistance information comprises the initial time of delaying the at least one signal communication based on the assistance information and the delaying the at least one signal transmission based on the assistance information comprises delaying the at least one signal communication associated with at least one of a physical uplink shared channel, a sounding reference signal, a random access channel or a physical uplink control channel after the initial time.

Preferably or in some implementations, the assistance information comprises the initial time of delaying the at least one signal transmission based on the assistance information and the delaying the at least one signal communication based on the assistance information comprises:

starting a timer when detecting a link failure, and delaying the at least one signal communication when the timer expires after the initial time.

Preferably or in some implementations, the at least one signal communication is associated with a radio link reconnection procedure.

Preferably or in some implementations, the initial time is adjusted by the propagation delay between the wireless terminal and the wireless network node.

Preferably or in some implementations, the assistance information comprises the propagation delay.

Preferably or in some implementations, the assistance information comprises the ephemeris of the airborne platform or the flying platform of the serving cell and the wireless terminal determines the propagation delay based on the ephemeris of the airborne platform or the flying platform of the serving cell.

The present disclosure relates to a wireless communication method for use in a wireless terminal. The method comprises:

receiving, from a wireless network node, assistance information associated with a serving cell of the wireless terminal, and disabling at least one signal communication based on the assistance information.

Various embodiments may preferably implement the following features:

Preferably or in some implementations, the assistance information comprises at least one of: a serving time interval, an initial time of disabling the at least one signal communication based on the assistance information, an ephemeris of an airborne platform or a flying platform of the serving cell, or a propagation delay between the wireless terminal and the wireless network node.

Preferably or in some implementations, the assistance information comprises the initial time of disabling the at least one signal communication based on the assistance information and the disabling the at least one signal communication based on the assistance information comprises at least one of:

not monitoring a physical downlink control channel after the initial time, not receiving signals in a physical downlink shared channel after the initial time, or not monitoring a reference signal after the initial time.

Preferably or in some implementations, the assistance information comprises the initial time of disabling the at least one signal communication based on the assistance information and the disabling the at least one signal communication based on the assistance information comprises:

starting a timer when detecting a link failure, and disabling the at least one signal communication when the timer expires after the initial time.

Preferably or in some implementations, the at least one signal communication is associated with a radio link reconnection procedure.

Preferably or in some implementations, the initial time is adjusted by the propagation delay between the wireless terminal and the wireless network node.

Preferably or in some implementations, the assistance information comprises the propagation delay.

Preferably or in some implementations, the assistance information comprises the ephemeris of the airborne platform or the flying platform of the serving cell and the wireless terminal determines the propagation delay based on the ephemeris of the airborne platform or the flying platform of the serving cell.

The present disclosure relates to a wireless communication method for a use in a wireless network node. The method comprises transmitting, to a wireless terminal, assistance associated with a serving cell of the wireless terminal.

Various embodiments may preferably implement the following features:

Preferably or in some implementations, the assistance information comprises at least one of a serving time interval, an ephemeris of an airborne platform or a flying platform of the serving cell, a location of a reference point, a distance threshold corresponding to the serving cell, an elevation angle from the reference point to the airborne platform or the flying platform of the serving cell, an elevation threshold corresponding to the serving cell, a propagation delay between the wireless terminal and the wireless network node, at least one time offset between a propagation delay of the serving cell and each of at least one propagation delay of at least one neighboring cell, at least one frequency gap between a Doppler shift of the serving cell and each of at least one Doppler shift at least one neighboring cell, an adjustment triggering time of adjusting the measurement configuration, a plurality of periods corresponding to a measurement gap of performing the at least one measurement, or an initial time of disabling or delaying the at least one signal communication based on the assistance information.

Preferably or in some implementations, the method further comprises transmitting, to the wireless terminal, an indication of disabling at least one measurement based on the assistance information.

The present disclosure relates to a wireless terminal, comprising:

a communication unit, configured to receive, from a wireless network node, assistance information associated with a serving cell of the wireless terminal, and a processor configured to disable at least one measurement based on the assistance information.

Various embodiments may preferably implement the following feature:

Preferably or in some implementations, the processor is further configured to perform any of the aforementioned wireless communication method.

The present disclosure relates to a wireless terminal, comprising:

a communication unit, configured to receive, from a wireless network node, assistance information associated with a serving cell of the wireless terminal, and a processor configured to adjust a measurement configuration of performing at least one measurement based on the assistance information.

Various embodiments may preferably implement the following feature:

Preferably or in some implementations, the processor is further configured to perform any of the aforementioned wireless communication method.

The present disclosure relates to a wireless terminal, comprising:

a communication unit, configured to receive, from a wireless network node, assistance information associated with a serving cell of the wireless terminal, and a processor configured to delay at least one signal communication based on the assistance information.

Various embodiments may preferably implement the following feature:

Preferably or in some implementations, the processor is further configured to perform any of the aforementioned wireless communication method.

The present disclosure relates to a wireless terminal, comprising:

a communication unit, configured to receive, from a wireless network node, assistance information associated with a serving cell of the wireless terminal, and a processor configured to disable at least one signal communication based on the assistance information.

Various embodiments may preferably implement the following feature:

Preferably or in some implementations, the processor is further configured to perform any of the aforementioned wireless communication method.

The present disclosure relates to a wireless network node comprising a communication unit, configured to transmit, to a wireless terminal, assistance associated with a serving cell of the wireless terminal.

Various embodiments may preferably implement the following feature:

Preferably or in some implementations, the wireless network node further comprises a processor configured to perform any of the aforementioned wireless communication method.

The present disclosure relates to a computer program product comprising a computer-readable program medium code stored thereupon, the code, when executed by a processor, causing the processor to implement a wireless communication method recited in any one of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
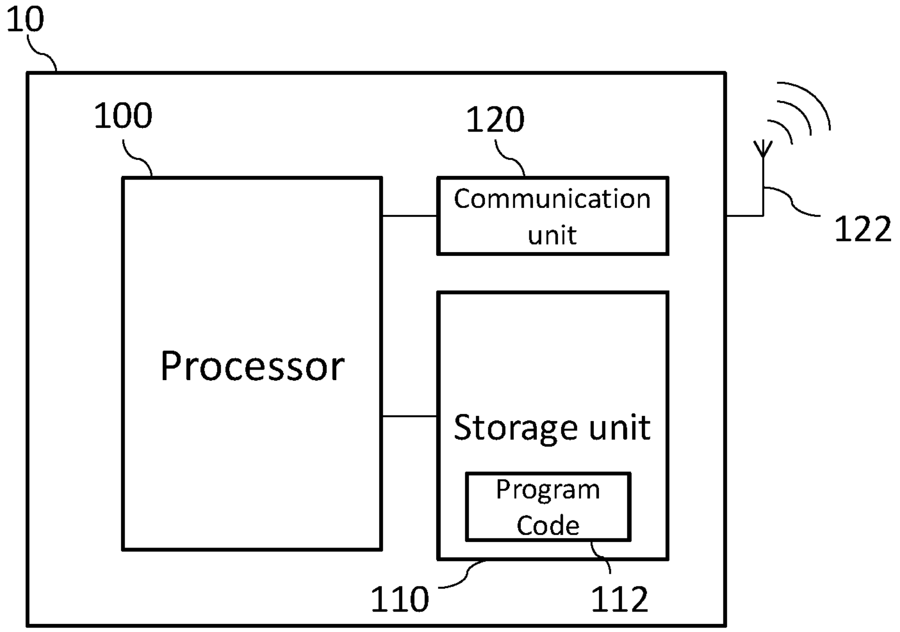
FIG. 1 shows a schematic diagram of a wireless terminal according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

In an embodiment, the storage unit 110 and the program code 112 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
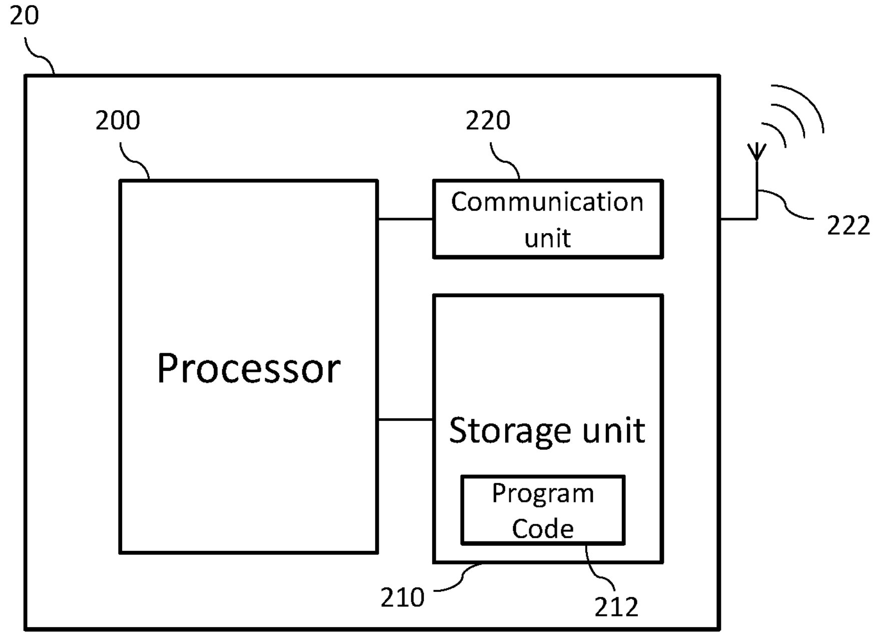
FIG. 2 shows a schematic diagram of a wireless network node 20 according to an embodiment of the present disclosure.

FIG. 2 relates to a schematic diagram of a wireless network node 20 according to an embodiment of the present disclosure. The wireless network node 20 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 20 may comprise (perform) at least one network function such as an access and mobility management function (AMF), a session management function (SMF), a user place function (UPF), a policy control function (PCF), an application function (AF), etc. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment).

In general, a transparent payload may not support inter-satellite link (ISL). That is, a satellite may have a ground BS (e.g. gNB), so as to serve an area in a one-hop manner. Thus, it may be reasonable to set a fixed service area on Earth for each BS. In an embodiment, the transparent payload is the remote radio head (RRH) of the BS and the size of the service area of the BS is determined by the minimum elevation of a feeder link.

Figure 3:
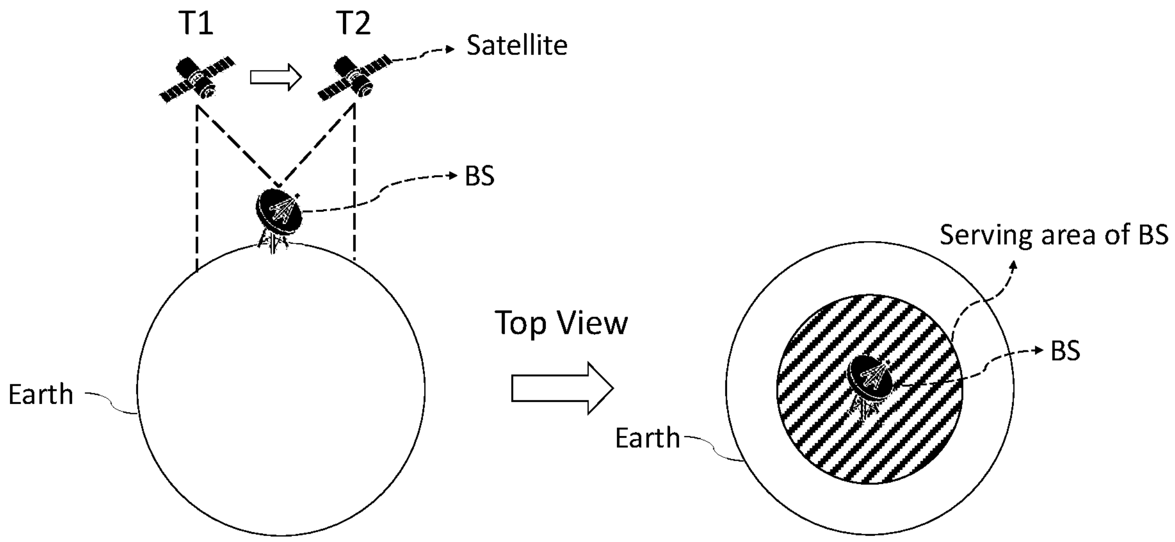
FIG. 3 shows a schematic diagram of a network comprising a base station and a satellite according to an embodiment of the present disclosure.

FIG. 3 shows a schematic diagram of a network comprising a BS and a satellite according to an embodiment of the present disclosure. In FIG. 3, a satellite sets a feeder link with the BS (e.g. gNB) at T1 and releases the feeder link with the BS at T2. After T2, another satellite may take the role of this satellite to provide continuous coverage of the service area.

Figure 4:
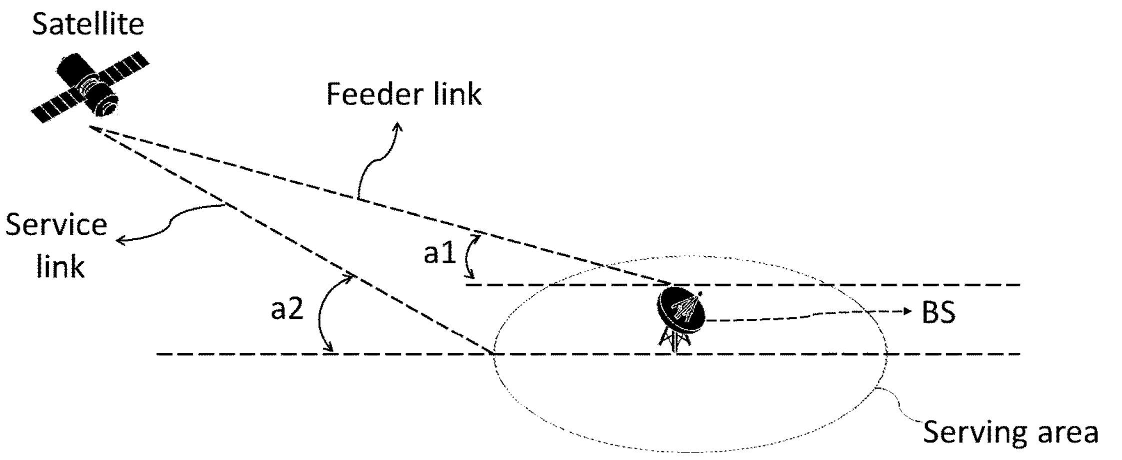
FIG. 4 shows a schematic diagram of a network comprising a base station and a satellite according to an embodiment of the present disclosure.

FIG. 4 shows a schematic diagram of a network comprising a BS (e.g. gNB) and a satellite according to an embodiment of the present disclosure. In FIG. 4, when the satellite enters the view of the BS (i.e. an angle a1≥min elevation angle of feeder link, e.g., 10 degrees), the satellite can be regarded as a candidate in a following service area covering. When the elevation angle of service link from this satellite is large enough (i.e. an angle a2≥min elevation angle of service link, e.g., 30 degrees), the satellite is able to start its RRH function for the BS.

In the present disclosure, the service area of a BS is assumed to be larger than the footprint of a satellite based on 2 aspects:

(1) Min elevation angle of the service link is generally larger than that of the feeder link.

(2) Setup of the BS on Earth is generally limited.

The description above applies to both earth-moving beam and earth-fixed beam.

In the present disclosure, the elevation may be equal to the elevation angle.

In the present disclosure, the satellite may have only one feeder link. Generally, the feeder link and the service link use different RF chains and antennas. According to an embodiment, one satellite with a low power consumption/cost/complexity may probably have only one feeder link connection.

In the present disclosure, the BS and the gateway (GW) may be co-located. More specifically, due to policy restriction, interference management and other reasons, the earth station site resource is generally very limited. Thus, it is reasonable to make full use of each available site and build earth BS with full capability. According to an embodiment of the present disclosure, the network deployment may be simplified by not considering the delay introduced by the separated BS and GW.

In the present disclosure, the UE may be equipped with a Global Navigation Satellite System (GNSS). In detail, the GNSS may be available for all NTN UEs. Via GNSS, the NTN UE may be able to estimate its location. In addition, the NTN UE uses the GNSS as a reference for frequency and/or time adjustments, while the TN UE uses the BS as the reference. With the GNSS based time/frequency reference, an NTN UE may be able to estimate frequency offset (e.g., Doppler offset) based on downlink (DL) signals.

Figure 5:
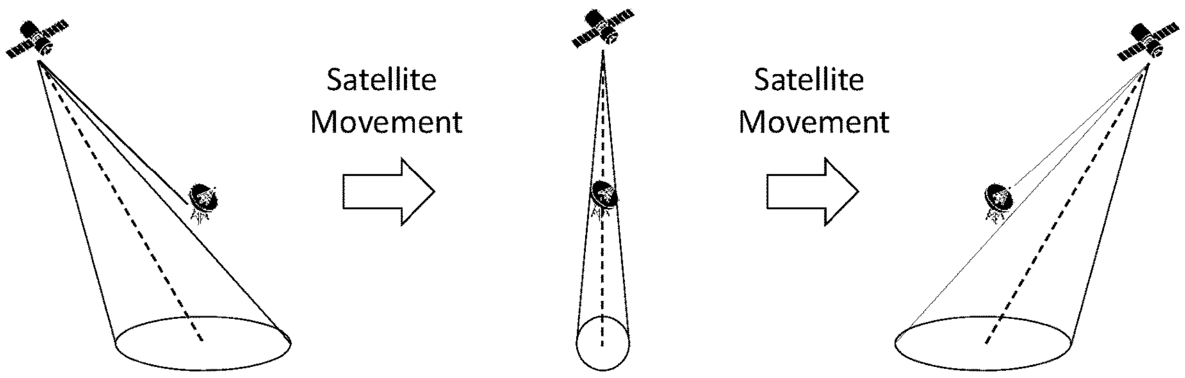
FIG. 5 shows a schematic diagram of coverages of the satellite according to an embodiment of the present disclosure.

FIG. 5 shows a schematic diagram of coverages of the satellite according to an embodiment of the present disclosure. In FIG. 5, the coverage (e.g. footprint) of the satellite using a steerable beam varies with the elevation angle. In an embodiment, a nadir beam of 60 km diameter changes to an ellipse of 60*175 km with the movement of the satellite.

Figure 6:
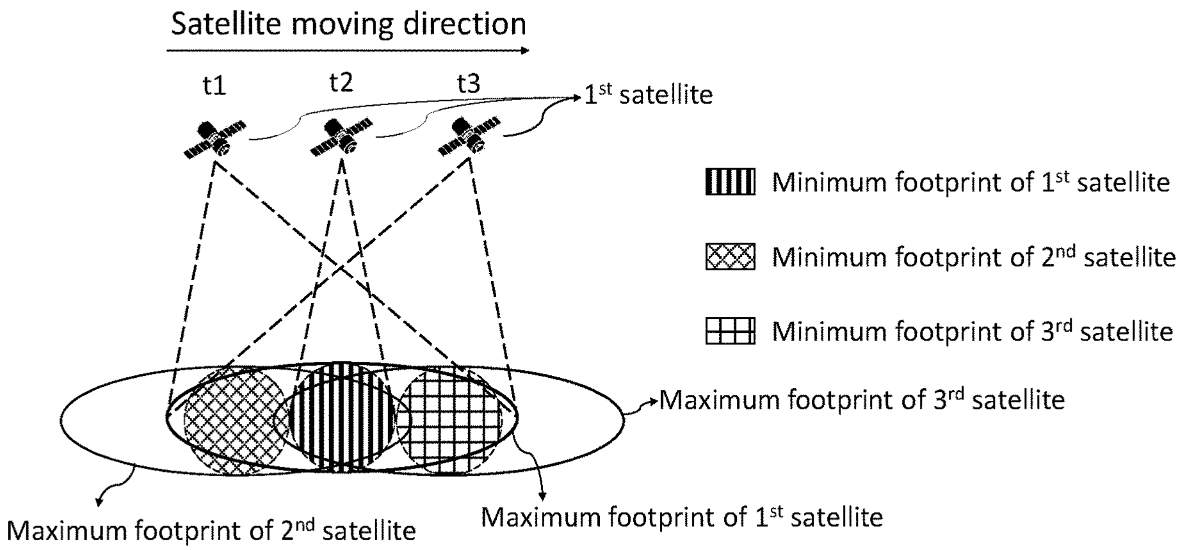
FIG. 6 shows a schematic diagram of overlapped footprints of the satellites according to an embodiment of the present disclosure.

To fulfill seamless coverage requirement, overlapped footprints of satellites may be adopted. FIG. 6 shows a schematic diagram of overlapped footprints of the satellites according to an embodiment of the present disclosure. In FIG. 6, one circle with vertical stripes refers to the minimum (e.g. nadir) footprint of a $1^{st}$ satellite which is in one solid line ellipse referring to the maximum footprint (e.g., at the minimum elevation) of the $1^{st}$ satellite. Similarly, the circle with diamond pattern refers to the minimum (e.g. nadir) footprint of a $2^{nd}$ satellite (e.g. a neighbor satellite of the $1^{st}$ satellite) in one solid line ellipse referring to the maximum footprint (e.g., at minimum elevation) of the $2^{nd}$ satellite. The circle with square pattern refers to the minimum (e.g. nadir) footprint of a $3^{rd}$ satellite (e.g. a neighbor satellite of the $1^{st}$ satellite) in one solid line ellipse referring to the maximum footprint (e.g., at minimum elevation) of the $3^{rd}$ satellite. As can be seen from FIG. 6, the overlapped area of two neighboring satellites may be very large. With the movement of the $1^{st}$ satellite from t1 to t3, the $1^{st}$ satellite covers the maximum footprint at t1 with the minimum elevation, covers the minimum footprint at t2 with the maximum elevation and covers the maximum footprint at t3 with the minimum elevation again. In an embodiment, a strategy for UEs in the minimum footprint may be reducing measurements of signals from neighboring satellites signal and stick to the $1^{st}$ serving satellite during the time interval [t1, t3].

Figure 7:
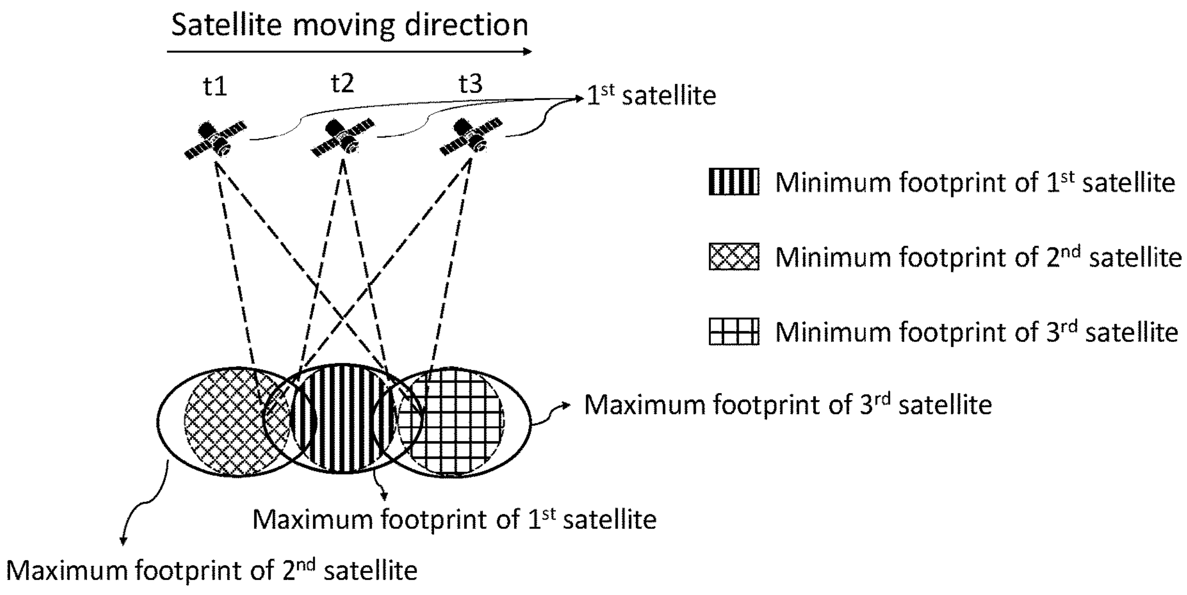
FIG. 7 shows a schematic diagram of overlapped footprints of the satellites according to an embodiment of the present disclosure.

FIG. 7 shows a schematic diagram of overlapped footprints of the satellites according to an embodiment of the present disclosure. In FIG. 7, the 3 satellites may have an advanced antenna system to reduce their footprint size at the minimum elevation and the overlapping areas among the footprints of the satellites become smaller. In such conditions, it may be difficult for some UEs to measure the signal quality of neighboring satellites. Therefore, the UE in the minimum footprint of the $1^{st}$ satellite may reduce measurements of signals from neighboring satellites during the time interval [t1, t3], so as to decrease the power and/or signaling consumption.

In order to allow the UE locating in the minimum footprint of the serving satellite to reduce the power and/or signaling consumption spent on the measurements (e.g., on signals from neighboring satellites), the BS may provide additional assistance information to the UE. According to an embodiment, the assistance information comprises at least one of:

1. Serving Time of Satellite(s) for a Given Area

The serving time of current and/or next satellites (i.e. serving satellite and/or neighboring satellites) for a given area may be calculated at the BS side and provided to UEs. In an embodiment, the serving time may be presented in a format of an absolute time interval (e.g. [t1, t3] where t1 and t3 are expressed in the format of absolute time).

2. Reference Point Location on Ground

In an embodiment, a reference point may be selected for both DL frequency pre-compensation and common TA (time advance) broadcast per satellite beam. In an embodiment, the reference point may be a center of each beam.

3. Threshold of Distance on Ground

The UE with the GNSS is able to estimate its own location and determine the distance between the UE and the reference point. The threshold of distance on ground may be used to divide UEs into UE groups separately adopting different measurement strategies.

4. Threshold of Elevation/Elevation of the Reference Point/Ephemeris

The UE is able to estimate the elevation of the reference point location (i.e. the location of the reference point) to the satellite based on an ephemeris (e.g. location) of the satellite. As an alternative or in addition, the UE may receive the elevation of the reference point location to the satellite from the BS. The threshold of elevation may be used to indicate an availability of the coverage of the serving satellite.

5. Round Trip Time (RTT) Difference Between Current and Next Satellites

The RTT difference between current and next satellites for a given area may be estimated by the BS based on a given reference point location or different sub-areas and provided to UEs.

6. Central Frequency Difference Between Current and Next Satellites

Central frequencies of the current and neighboring satellites may be different because of Doppler pre-compensations. To facilitate fast SSB searching at UE side with low power consumption, the central frequency difference between the central frequencies of the current and next satellites may be provided to the UE.

7. Multiple SSB Measurement Time Configurations (SMTCs) for a UE or a UE Group

A measurement gap is configured with an SMTC to determine the period and the starting time of the measurement gap. For UEs in different sub-areas of a coverage of a satellite, measurement gaps with different periods may be used. With the movement of satellites, the measurement period may be shorter when the satellite switch is going to happen soon according to an embodiment of the present disclosure.

Embodiment 1: Disable Unnecessary Measurement

In this embodiment, the BS (e.g. gNB) pre-calculates the serving satellite(s) for its service area. This pre-calculation provides a serving satellite list for a given sub-area in the service area. According to an embodiment, each entry in this list has the following elements: link setup time T_xx1, switch time T_xx2. For a given area, the time interval [T_xx1, T_xx2] is the serving time of the corresponding satellite (xx refers to satellite index, which is generalized to "current/next" in following description). Since UEs have GNSS, the [T_xx1, T_xx2] is the absolute time provided by GNSS timing.

As an alternative, the format of the service time interval may be [T_xx1, T_xx3], wherein T_xx1 is the link setup time and T_xx3 is a link available duration (e.g. T_xx3=(T_xx2−T_xx1)).

For a satellite with regenerative payload, i.e., BS on board, the method described below is also applicable.

In an embodiment, the measurement related actions carried out at the UE side include at least one of:

1. Reception/monitoring of corresponding downlink reference signal(s).
2. Calculating and reporting of measurement results (e.g., channel quality indication (CQI), reference signal received power (RSRP), signal to interference plus noise ratio (SINR), etc.).
3. Triggering measurement events.

Embodiment 1-1: Time Based Measurement Disable

BS Action:

In this embodiment, the BS indicates a serving time interval of the current satellite (e.g. serving satellite) for a given area, named [T_current1, T_current2], by means of broadcast/multicast/unicast.

In an embodiment, the ephemeris of the current serving satellite may be broadcasted by the BS.

In an embodiment, the format of T_current1 and T_current2 is absolute time, which is available for both BS and UE through the GNSS.

In an embodiment, the BS may send an indication of disabling/enabling measurement at UE side, e.g., by means of broadcast/multicast/unicast.

UE Action:

In this embodiment, the UE receives a serving time interval of current satellite (e.g. serving satellite), i.e. [T_current1, T_current2].

In an embodiment, the UE receives the indication of disabling/enabling measurement, if the BS sends the indication.

In an embodiment, the disabling measurement may be implicitly indicated to the UE. That is, the UE may disable measurement without receiving the indication of disabling measurement. For example, an operation of "disabling measurement during a specific time interval" may be a predefined action of the UE. Under such conditions, the BS may transmit only the specific time interval to the UE and the UE performs the predefined action in response to receiving the specific time interval.

In an embodiment, the disabling measurement is (implicitly) indicated and the UE disables its downlink (DL) measurement during the time interval [T_current1+PD_sat_ue, T_current2+PD_sat_ue].

In an embodiment of receiving the indication for disabling measurement, the UE disables the DL measurement during the time interval [T_current1+PD_sat_ue, T_current2+PD_sat_ue].

In an embodiment of receiving the indication for enabling measurement, the UE carries out the DL measurement during the time interval [T_current1+PD_sat_ue, T_current2+PD_sat_ue].

In an embodiment, the PD_sat_ue is a propagation delay between the UE and the BS.

In an embodiment, the PD_sat_ue may be estimated by the UE. For example, the UE may estimate the PD_sat_ue based on the location of the UE and the ephemeris of the current serving satellite.

In an embodiment, the PD_sat_ue may be estimated by the BS and indicated to the UE. For example, the BS may calculate the PD_sat_ue based on the location of UE and the ephemeris of current serving satellite and indicates the UE the calculated PD_sat_ue.

In an embodiment, the DL measurement includes the radio resource measurement for handover (HO) and/or radio link failure (RLF) and/or beam management (BM).

Embodiment 1-2: Time+Distance Based Measurement Disabling

BS Action:

In this embodiment, the BS indicates a serving time interval of the current satellite for a given area, named [T_current1, T_current2], by means of broadcast/multicast/unicast.

In an embodiment, the ephemeris of the current serving satellite may be broadcast by the BS.

In an embodiment, the BS may indicate a location of a reference point and a distance threshold of the current serving satellite, e.g., by means of broadcast/multicast/unicast.

In an embodiment, the BS may indicate (e.g. transmit) an indication of the disabling/enabling measurement at UE side.

UE Action:

In this embodiment, the UE receives the serving time interval of the current satellite, i.e. [T_current1, T_current2].

In an embodiment, the UE receives the indication of the disabling/enabling measurement, if the BS send the indication.

In an embodiment, the UE receives the location of the reference point and the distance threshold from the BS.

In an embodiment, the UE determines its distance to the location of the reference point based on (1) the location of the UE estimated by using GNSS, or (2) an indication from the BS, wherein the BS determines the distance between the locations of the UE and the reference point based on a location report of the UE.

In an embodiment, if a measurement disabling is predetermined and the distance between the UE and the reference point is smaller than the distance threshold, the UE disables the DL measurement during the time interval [T_current1+PD_sat_ue, T_current2+PD_sat_ue].

In an embodiment, if the distance between the UE and the reference point is smaller than the distance threshold and the UE receives the indication of disabling measurement from the BS, the UE disables the DL measurement during the time interval [T_current1+PD_sat_ue, T_current2+PD_sat_ue].

In an embodiment, if the distance between the UE and the reference point is not smaller than the distance threshold and/or the UE receives the indication of enabling measurement from the BS, the UE enables the DL measurement during the time interval [T_current1+PD_sat_ue, T_current2+PD_sat_ue].

In an embodiment, the PD_sat_ue is the propagation delay between the UE and the BS.

In an embodiment, the PD_sat_ue is estimated by the UE, e.g., based on the location of the UE and the ephemeris of the current serving satellite.

In an embodiment, the PD_sat_ue is estimated by the BS and indicated to the UE. For example, the BS may estimate the PD_sat_ue based on a UE reported location/trajectory and the ephemeris of the current serving satellite.

In an embodiment, the DL measurement includes the radio resource measurement associated with at least one of handover (HO), radio link failure (RLF) and beam management (BM).

Embodiment 1-3: Elevation Based Measurement Disable

BS Action:

In this embodiment, the ephemeris of the current serving satellite is broadcast by the BS.

In addition, the BS indicates the reference point location and an elevation threshold of current serving satellite, e.g., by means of broadcast/multicast/unicast.

In an embodiment, the BS may send an indication of disabling/enabling measurement at UE side, e.g., by means of broadcast/multicast/unicast.

UE Action:

In this embodiment, the UE receives the reference point location and an elevation threshold from the BS.

In addition, the UE determines the elevation of the reference point to the satellite.

In an embodiment, the elevation of the reference point to the satellite can be calculated by the UE based on the location of the reference point and the ephemeris of the satellite.

In an embodiment, the elevation of the reference point to the satellite is indicated by the BS, e.g., via broadcast/multicast/unicast.

In an embodiment, the UE receives the indication of disabling/enabling measurement, if the BS send the indication.

In an embodiment, if disabling measurement is implicitly indicated (e.g. predefined) without indication, the UE disables the DL measurement when the elevation of the reference point to the satellite is larger than the elevation threshold.

In an embodiment, if the indication is to disable measurement, UE disables DL measurement if the elevation of the reference point to the satellite is larger than the elevation threshold.

In an embodiment, if the indication indicates the enabling measurement, the UE carries out the DL measurement.

In an embodiment, the DL measurement includes the radio resource measurement for handover (HO) and/or radio link failure (RLF) and/or beam management (BM).

Embodiment 2: Assistance for Efficient Measurement

In current terrestrial networks, a synchronization signal block (SSB) based intra-frequency measurement may be carried out by a UE without a measurement gap, provided that the center frequency of the SSB of the serving cell indicated for measurement and the center frequency of the SSB of the neighbor cell are the same and the subcarrier spacing of the two SSBs are also the same. However, these assumptions may not be met in the NTN scenarios. The Doppler pre-compensations of multiple satellites are different and the propagation delays of different satellites to a given UE are also different. Under such conditions, the measurement gap is needed for intra-frequency SSB based measurements.

Embodiment 2-1: Time/Frequency Gap for Fast Searching at UE Side

BS Action:

In this embodiment, the BS broadcasts/multicasts/unicasts a list of satellite-level time/frequency assistance information in a given coverage of a satellite, wherein the satellite-level time/frequency assistance information includes information of neighboring satellites which is exemplified in the following:

a) Propagation delay gap (PDG_sat_x): In a coverage of the current serving satellite, the propagation delay from the current serving satellite to the location of the reference point (called PD_current hereinafter), can be used as a common coarse timing advance (TA) value. In addition, the propagation delay from a neighboring satellite to the location of the reference point of the current serving satellite (called PD_sat_x hereinafter (x is the index of the neighboring satellite) may be calculated by the BS based on the ephemeris of the neighboring satellite. In an embodiment, the propagation delay gap (called PDG_sat_x hereinafter) may be provided by the BS to the UE located in the coverage of the current serving satellite. In an embodiment, the UE may use the PDG_sat_x as an offset of the measurement gap due to the different propagation delay.

b) Frequency gap (FG_sat_x): In a coverage of the current serving satellite, the DL Doppler shift with regard to the location of the reference point caused by the movement of current serving satellite is generally pre-compensated by the BS. As a result, the Doppler shift of the current serving satellite experienced at the reference point location is zero. However, a neighboring satellite uses a different Doppler pre-compensation with regard to its own reference point location. Thus, it is beneficial to provide the experienced Doppler shift of DL signal of the neighboring satellite at the location of the reference point of the current serving satellite. As a result, the UE in the coverage of the current serving satellite is able to search the SSB of the neighboring satellites in a quicker way and to reduce power consumption.

UE Action:

In this embodiment, the UE receives the list of satellite-level time/frequency assistance information from the BS.

In an embodiment, the UE may setup (e.g. determine) the SS/PBCH block measurement timing configuration (SMTC) in accordance with the received satellite-level time/frequency assistance information (e.g. periodicityAndOffset parameter and PDG_sat_x) from the BS. More specifically, the PDG_sat_x works as an extra time offset in a starting point of the measurement gap.

In an embodiment, the UE uses FG_sat_x to coarsely locate the DL signals of the $x^{th}$ neighboring satellite in the measurement.

Embodiment 2-2: Multiple Measurement Gaps (MGs) Based on Distance

BS Action:

In this embodiment, the BS indicates multiple SMTCs for a UE or a UE group, e.g. by means of broadcast/multicast/unicast. For example, two SMTCs are indicated, wherein one SMTC has a short period (e.g. measurement gap) and the other SMTC has a long period.

In addition, the BS indicates the reference point location and a distance threshold of current serving satellite, by means of broadcast/multicast/unicast.

UE Action:

In this embodiment, a UE or a UE group receives the multiple SMTCs from the BS.

In addition, the UE determines the distance to the location of the reference point. In an embodiment, the UE estimates (e.g. determines or calculates) the distance between the UE and the reference point based on its GNSS. As an alternative or in addition, the UE estimates the distance between the UE and the reference point based on indication from the BS, wherein the BS estimates the distance between the UE and the reference point based on the location report of the UE.

In an embodiment, if the distance between the UE and the reference point is smaller than the distance threshold, the UE setups (e.g. adopts or uses) the SMTC with the long period.

In an embodiment, if the distance between the UE and the reference point is not smaller than the distance threshold, the UE setups the SMTC with the short period.

Embodiment 2-3: Multiple Measurement Gaps (MGs) Based on Timer

BS Action:

In this embodiment, the BS indicates a serving time interval of a current serving satellite for a given area (e.g. [T_current1, T_current2]) by means of broadcast/multicast/unicast.

In an embodiment, the ephemeris of the current serving satellite may be broadcasted by the BS.

In an embodiment, the BS indicates multiple SMTCs for a UE or a UE group, by means of broadcast/multicast/unicast. For example, two SMTCs may be indicated to the UE or the UE group, wherein one SMTC has a short period and another SMTC has a long period.

In an embodiment, the BS indicates an SMTC adjust time point T_smtc_adjust within [T_current1, T_current2], e.g., by means of broadcast/multicast/unicast.

In an embodiment, the format of T_current1, T_current2 and T_smtc_adjust is absolute time, which is available for both the BS and the UE through the GNSS.

UE Action:

In this embodiment, a UE or a UE group receives the multiple SMTCs from the BS.

In addition, the UE receives the serving time interval (i.e. [T_current1, T_current2]) and the SMTC adjust time T_smtc_adjust from the BS.

Based on the serving time interval (i.e. [T_current1, T_current2]) and the SMTC adjust time T_smtc_adjust, the UE monitors the current absolute time for SMTC setup.

In an embodiment, if the current absolute time does not reach T_smtc_adjust+PD_sat_ue, the UE setups SMTC with the long period.

In an embodiment, if current absolute time reaches T_smtc_adjust+PD_sat_ue, the UE setups SMTC with the short period.

In this embodiment, the PD_sat_ue is the propagation delay between the UE and the BS.

In an embodiment, the PD_sat_ue may be estimated by the UE (e.g. based on location of the UE and the ephemeris of the current serving satellite).

In an embodiment, the PD_sat_ue may be estimated by the BS and indicated to the UE. For example, the PD_sat_ue may be calculated based on the UE reported location/trajectory and the ephemeris of the current serving satellite.

Embodiment 3: Proactive Flow Control Before Link Switch

Since the link switch may happen more frequently in the NTN than that in the TN, proactive flow control may be beneficial to reduce massive re-transmissions before and after the link switch. Based on the assistance information from the BS, the UE may disable its downlink reception and/or delay its transmission until the link switch completes.

Embodiment 3-1: Initial Transmission Control

BS Action:

In this embodiment, the BS indicates a serving time interval of the current serving satellite for a given area (i.e. [T_current1, T_current2]) and/or an initial transmission pause time point T_tx_pause, e.g., by means of broadcast/multicast/unicast. In an embodiment the initial transmission pause time point T_tx_pause is within [T_current1, T_current2].

In an embodiment, the format of T_current1, T_current2 and T_tx_pause is an absolute time, which is available for both the BS and the UE through the GNSS.

UE Action:

In this embodiment, the UE receives the serving time interval of the current serving satellite (i.e. [T_current1, T_current2]) and/or the initial transmission pause time point T_tx_pause and monitors the current absolute time.

In an embodiment, if the current absolute time does not reach T_tx_pause+PD_sat_ue, a UE may perform at least one of the following operations:

A) enabling at least one signal communication (e.g. monitoring a physical downlink control channel (PDCCH), receiving a physical downlink shared channel (PDSCH), monitoring downlink reference signal (RS) and so on).

B) performing transmission(s) associated with at least one of physical uplink shared channel (PUSCH), sounding reference signal (SRS), random access channel (RACH), physical uplink control channel (PUCCH), . . . , etc.

In an embodiment, if current absolute time reaches T_tx_pause+PD_sat_ue, an RRC_IDLE/RRC_INACTIVE UE may perform at least one of the following operations:

A) disabling at least one signal communication (e.g. not monitoring PDCCH, not receiving PDSCH, not monitor downlink RS and so on) until the next satellite takes over the serving area (e.g. after T_current2+PD_sat_ue).

B) delaying at least one signal communication (e.g. transmission associated with the PUSCH, the SRS, the RACH the PUCCH, . . . , etc.) until the next satellite takes over the serving area (e.g. after T_current2+PD_sat_ue).

In an embodiment, the PD_sat_ue is the propagation delay between the UE and the BS.

In an embodiment, the PD_sat_ue is estimated by the UE, e.g. based on the location of the UE and the ephemeris of the current serving satellite.

In an embodiment, the PD_sat_ue is estimated by the BS and indicated to the UE. For example, the BS may calculate the PD_sat_ue based on the UE reported location/trajectory and the ephemeris of the current serving satellite.

Embodiment 3-2: Radio Link Reconnection Control

BS Action:

In this embodiment, the BS indicates a serving time interval of a current serving satellite for a given area (i.e. [T_current1, T_current2]) and/or a radio link reconnection pause time point T_recon_pause, e.g., by means of broadcast/multicast/unicast. In an embodiment, the radio link reconnection pause time point T_recon_pause is within [T_current1, T_current2].

In an embodiment, the format of the T_current1, T_current2 and T_recon_pause is an absolute time, which is available for both the BS and the UE through the GNSS.

UE Action:

In this embodiment, the UE receives the serving time interval of the current serving satellite [T_current1, T_current2] and/or the radio link reconnection pause time point T_recon_pause and the UE monitors current the absolute time.

In an embodiment, if a physical layer problem is detected (e.g., upon receiving N311 consecutive "out-of-sync" indications), an RRC_CONNECTED UE starts a timer (e.g., T310) to monitor the recovery of radio link. If the timer expires, this UE checks current absolute time.

According to an embodiment, if the current absolute time at which the timer expires reaches T_recon_pause+PD_sat_ue, the UE delays its radio link reconnection (procedure) until a next satellite takes over the serving area (i.e., after T_current2+PD_sat_ue).

According to an embodiment, if the current absolute time at which the timer expires does not reach T_recon_pause+PD_sat_ue, the UE may carry out the radio link reconnection (procedure) immediately.

In an embodiment, the PD_sat_ue is the propagation delay between the UE and the BS.

In an embodiment, the PD_sat_ue is estimated by the UE, e.g. based on the location of the UE and the ephemeris of the current serving satellite.

In an embodiment, the PD_sat_ue is estimated by the BS and indicated to the UE. For example, the BS may calculate the PD_sat_ue based on the UE reported location/trajectory and the ephemeris of the current serving satellite.

According to an embodiment, during the serving time of the serving satellite, DL measurement for HO/RLF/BM at UE side may be disabled based on extra assistance information provided by the BS.

In an embodiment, the assistance information comprises at least one of:

1. The serving time interval of current satellite for a given area
2. The ephemeris (e.g. location) of the current serving satellite
3. An indication of disabling/enabling measurement
4. The propagation delay between the UE and the BS
5. The reference point location and a distance threshold of current serving satellite
6. The elevation of the reference point location to the satellite and an elevation angle of current serving satellite In an embodiment, the UE may disable the measurement based on the assistance information via at least one of the following ways:

1. Time based: the UE uses the serving time interval as the reference of disabling the measurement.
2. Time+distance based: UE determines its distance to the reference point and compares its distance with the distance threshold. The UE disables the measurement according to the comparison result and the serving time interval.
3. Elevation based: The UE compares the elevation of the reference point location to the current serving satellite with the elevation threshold. The UE disables the measurement according to the comparison result.

According to an embodiment, since the Doppler pre-compensations and/or propagation delays of satellite are quite different in the NTN, the measurement gap (MG) is needed to measure the DL signals of neighboring satellites.

In order to achieve more efficient measurements, the BS may provide assistance information including at least one of:

1. A time offset based on propagation delay should be applied in the MG start time.
2. A frequency gap due to the Doppler pre-compensation of a neighboring satellite can be provided to ease the DL signal search at the UE side.
3. The reference point location and a distance threshold of a current serving satellite can be provided to group UEs by sub-area.
4. The serving time interval of current satellite for a given area and the MG adjust time can be provided to UEs to switch its MG period automatically.
5. Multiple MG periods can be configured based on distance or timer.
   1. 5-1 Multiple MG periods with different length can be configured.
   2. 5-2 For the UE at the coverage edge (based on distance), the short MG period can be used.
   3. 5-3 If the serving time of current satellite is approaching its end, the short MG period can be used.

According to an embodiment, the proactive flow control is beneficial to reduce massive re-transmissions before and after the link switch in the NTN. Based on the assistance information from the BS, the UE may delay its transmissions until the link switch complete.

Figure 8:
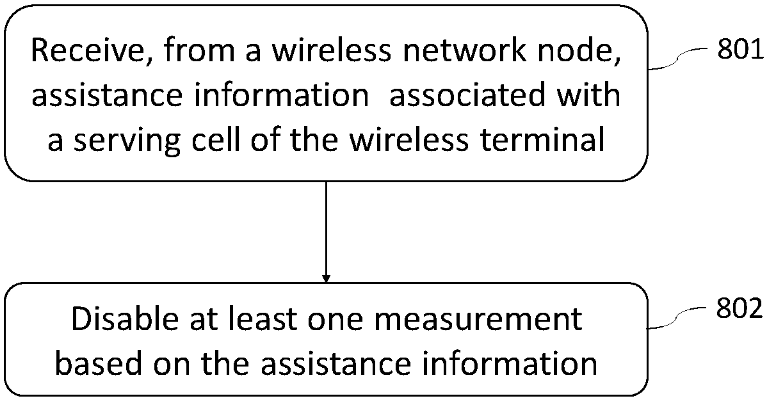
FIG. 8 shows a flowchart of a process according to an embodiment of the present disclosure.

In an embodiment, the assistant information includes at least one of:

1. The serving time interval of current satellite for a given area
2. The initial transmission/radio link reconnection pause time
3. The ephemeris of the current serving satellite
4. The propagation delay between the UE and the BS FIG. 8 shows a flowchart of a process according to an embodiment of the present disclosure. The process shown in FIG. 8 may be used in a wireless terminal (e.g. UE) and comprises the following steps:

Step 801: Receive, from a wireless network node, assistance information associated with a serving cell of the wireless terminal.

Step 802: Disable at least one measurement based on the assistance information.

More specifically, the wireless terminal may receive assistance information associated with a serving cell of the wireless terminal from a wireless network node (e.g. BS or gNB). In an embodiment, the assistance information may relate to an airborne platform or a flying platform (e.g. satellite, drone or balloon) of the serving cell. Based on the assistance information, the wireless terminal disables (e.g. does not perform) at least one measurement, so as to reduce power consumption.

In an embodiment, the assistance information comprises at least one of a serving time interval, an ephemeris of an airborne platform or a flying platform of the serving cell, a location of a reference point, a distance threshold corresponding to the serving cell, an elevation angle from the reference point to the airborne platform or the flying platform of the serving cell, an elevation threshold corresponding to the serving cell, or a propagation delay between the wireless terminal and the wireless network node.

In an embodiment, the assistance information comprises the serving time interval. In this embodiment, the wireless terminal disables the measurement(s) in the serving time interval.

In an embodiment, the assistance information comprises the serving time interval, the location of the reference point and the distance threshold corresponding to the serving cell. In this embodiment, the wireless terminal disables the measurement(s) during the serving time interval when a distance between the reference point and the wireless terminal is smaller than the distance threshold.

In an embodiment, the serving time interval is adjusted by the propagation delay between the wireless terminal and the wireless network node.

In an embodiment, the propagation delay between the wireless terminal and the wireless network node is comprised in the assistance information. As an alternative, the assistance information comprises the ephemeris of the airborne platform or the flying platform of the serving cell and the wireless terminal determines the propagation delay based on the ephemeris of the airborne platform or the flying platform of the serving cell.

In an embodiment, the assistance information comprises the elevation threshold. In this embodiment, the wireless terminal disables the measurement(s) when the elevation angle between the reference point and the airborne platform or the flying platform of the serving cell is greater than the elevation threshold.

In an embodiment, the assistance information comprises the elevation angle between the reference point and the airborne platform or the flying platform of the serving cell. As an alternative, the assistance information comprises the ephemeris of the airborne platform or the flying platform of the serving cell and the location of the reference point and the wireless terminal determines the elevation angle between the reference point and the serving cell based on the ephemeris of the airborne platform or the flying platform of the serving cell and the location of the reference point.

In an embodiment, the at least one measurement is associated with at least one of a handover procedure, a radio link failure or a beam management procedure.

In an embodiment, the at least one measurement comprises at least one of:

receiving at least one reference signal of the at least one measurement, monitoring at least one reference signal of the at least one measurement, calculating at least one measurement result of the at least one measurement, reporting at least one measurement result of the at least one measurement, or triggering at least one measurement event.

In an embodiment, the wireless terminal receives an indication of disabling the measurement(s) based on the assistance information from the wireless network node.

Figure 9:
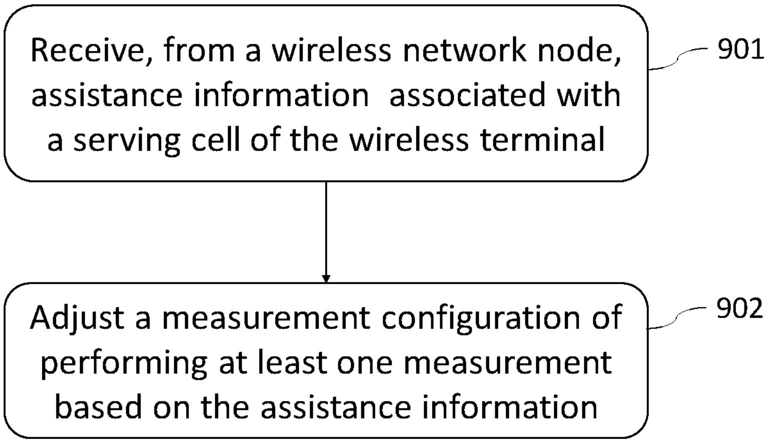
FIG. 9 shows a flowchart of a process according to an embodiment of the present disclosure.

FIG. 9 shows a flowchart of a process according to an embodiment of the present disclosure. The process shown in FIG. 9 may be used in a wireless terminal (e.g. UE) and comprises the following steps:

Step 901: Receive, from a wireless network node, assistance information associated with a serving cell of the wireless terminal.

Step 902: Adjust a measurement configuration of performing at least one measurement based on the assistance information.

In the process shown in FIG. 9, the wireless terminal receives the wireless terminal may receive assistance information associated with a serving cell of the wireless terminal from a wireless network node (e.g. BS). In an embodiment, the assistance information may relate to an airborne platform or a flying platform (e.g. satellite, drone or balloon) of the serving cell. Based on the assistance information, the wireless terminal adjusts a measurement configuration of performing at least one measurement.

In an embodiment, the assistance information comprises at least one of:

at least one time offset between a propagation delay of the serving cell and each of at least one propagation delay of at least one neighboring cell, at least one frequency gap between a Doppler shift of the serving cell and each of at least one Doppler shift at least one neighboring cell, a location of a reference point, a distance threshold corresponding to the serving cell, a serving time interval of the serving cell of the wireless terminal, an adjustment triggering time of adjusting the measurement configuration, a plurality of periods corresponding to a measurement gap of performing the at least one measurement, or a propagation delay between the wireless terminal and the wireless network node.

In an embodiment, the assistance information comprises the at least one time offset. In this embodiment, the wireless terminal adjusts a starting time of a measurement gap by the time offset corresponding to one of the at least one neighboring cell for performing the at least one measurement corresponding to the one of the at least one neighboring cell.

In an embodiment, the assistance information comprises the distance threshold corresponding to the serving cell and the plurality of periods corresponding to the measurement gap of performing the at least one measurement. In this embodiment, the wireless terminal adjusts a period of the measurement gap of performing the measurement(s) to a first period in the plurality of periods when a distance between the wireless terminal and the reference point is smaller than the distance threshold. As an alternative or in addition, the wireless terminal adjusts the period of the measurement gap of performing the at least one measurement to a second period in the plurality of periods when the distance between the wireless terminal and the reference point is greater than or equal to the distance threshold. In an embodiment, the first period is greater than the second period.

In an embodiment, the assistance information further comprises the distance between the wireless terminal and the reference point. As an alternative, the assistance information comprises the location of the reference point and the wireless terminal determines the distance between the wireless terminal and the reference point based on the location of the reference point.

In an embodiment, the assistance information comprises the adjustment triggering time of adjusting the measurement configuration. In this embodiment, the wireless terminal adjusts a period of the measurement gap of performing the at least one measurement to a first period before the adjustment triggering time. As an alternative or in addition, the wireless terminal adjusts the period of the measurement gap of performing the at least one measurement to a second period after the adjustment triggering time. In an embodiment, the first period is greater than the second period.

In an embodiment, the adjustment triggering time is adjusted by the propagation delay between the wireless terminal and the wireless network node.

In an embodiment, the assistance information further comprises the propagation delay. As an alternative, the assistance information comprises an ephemeris of an airborne platform of or a flying platform of the serving cell and the wireless terminal determines the propagation delay based on the ephemeris of the airborne platform or the flying platform of the serving cell.

In an embodiment, the at least one measurement comprises at least one synchronization based measurement or at least one SSB measurement.

Figure 10:
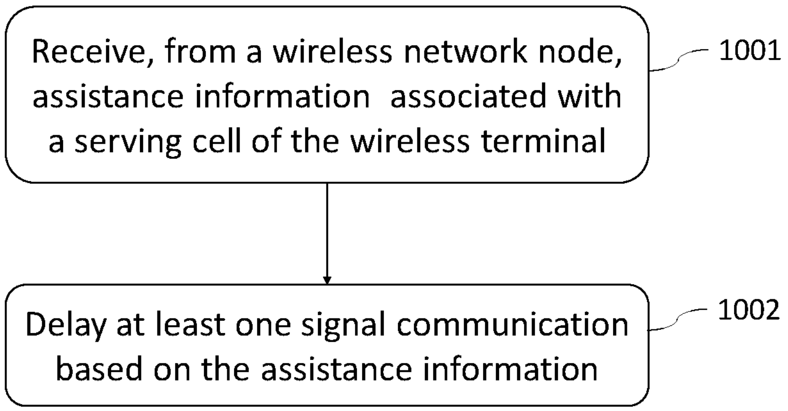
FIG. 10 shows a flowchart of a process according to an embodiment of the present disclosure.

FIG. 10 shows a flowchart of a process according to an embodiment of the present disclosure. The process shown in FIG. 10 may be used in a wireless terminal (e.g. UE) and comprises the following steps:

Step 1001: Receive, from a wireless network node, assistance information associated with a serving cell of the wireless terminal.

Step 1002: Delay at least one signal communication based on the assistance information.

More specifically, the wireless terminal may receive assistance information associated with a serving cell of the wireless terminal from a wireless network node (e.g. BS or gNB). In an embodiment, the assistance information may relate to an airborne platform or a flying platform (e.g. satellite, drone or balloon) of the serving cell. Based on the assistance information, the wireless terminal delays at least one signal communication.

In an embodiment, the assistance information comprises at least one of:

a serving time interval, an initial time of delaying the at least one signal communication based on the assistance information, an ephemeris of an airborne platform or a flying platform of the serving cell, or a propagation delay between the wireless terminal and the wireless network node.

In an embodiment, the assistance information comprises the initial time of delaying the at least one signal communication based on the assistance information. In this embodiment, the wireless terminal delays the signal communication(s) associated with at least one of a physical uplink shared channel, a sounding reference signal, a random access channel or a physical uplink control channel after the initial time. In an embodiment, the assistance information comprises the serving time interval and the signal communication(s) is delayed to no earlier than the end of the serving time interval.

In an embodiment, the assistance information comprises the initial time of delaying the at least one signal transmission based on the assistance information. In this embodiment, the wireless terminal starts a timer when detecting a link failure and delays the at least one signal communication when the timer expires after the initial time. In an embodiment, the assistance information comprises the serving time interval and the signal communication(s) is delayed to no earlier than the end of the serving time interval.

In an embodiment, the at least one signal communication is associated with a radio link reconnection procedure.

In an embodiment, the initial time is adjusted by the propagation delay between the wireless terminal and the wireless network node.

In an embodiment, the assistance information comprises the propagation delay. As an alternative, the assistance information comprises the ephemeris of the airborne platform or the flying platform of the serving cell and the wireless terminal determines the propagation delay based on the ephemeris of the airborne platform or the flying platform of the serving cell.

Figure 11:
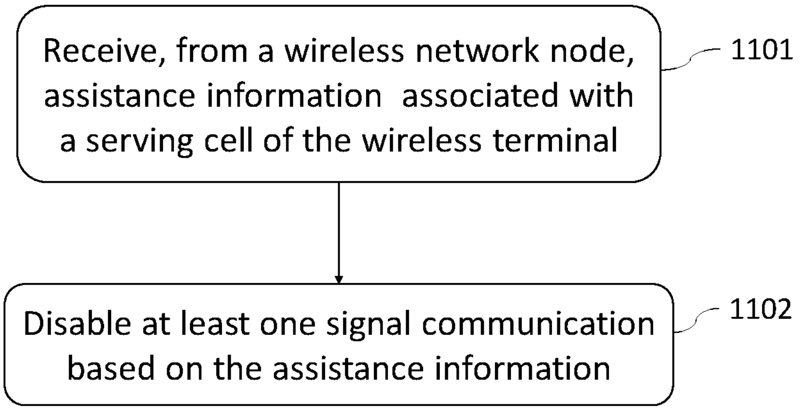
FIG. 11 shows a flowchart of a process according to an embodiment of the present disclosure.

FIG. 11 shows a flowchart of a process according to an embodiment of the present disclosure. The process shown in FIG. 11 may be used in a wireless terminal (e.g. UE) and comprises the following steps:

Step 1101: Receive, from a wireless network node, assistance information associated with a serving cell of the wireless terminal.

Step 1102: Disable at least one signal communication based on the assistance information.

More specifically, the wireless terminal may receive assistance information associated with a serving cell of the wireless terminal from a wireless network node (e.g. BS or gNB). In an embodiment, the assistance information may relate to an airborne platform or a flying platform (e.g. satellite, drone or balloon) of the serving cell. Based on the assistance information, the wireless terminal disables (e.g. does not perform) at least one signal communication.

In an embodiment, the assistance information comprises at least one of:

- a serving time interval,
- an initial time of disabling the at least one signal communication based on the assistance information,
- an ephemeris of an airborne platform or a flying platform of the serving cell, or
- a propagation delay between the wireless terminal and the wireless network node.

In an embodiment, the assistance information comprises the initial time of disabling the at least one signal communication based on the assistance information. In this embodiment, the wireless terminal disables the at least one signal communication based on the assistance information by performing at least one of:

- not monitoring a physical downlink control channel after the initial time,
- not receiving signals in a physical downlink shared channel after the initial time, or
- not monitoring a reference signal after the initial time.

In an embodiment, the assistance information comprises the serving time interval and the wireless terminal disables the signal communication(s) from the initial time to the end of the serving time interval.

In an embodiment, the assistance information comprises the initial time of disabling the at least one signal communication based on the assistance information. In this embodiment, the wireless terminal starts a timer when detecting a link failure and disables the at least one signal communication when the timer expires after the initial time. In an embodiment, the assistance information comprises the serving time interval and the wireless terminal disables the at least one signal communication when the timer expires after the initial time and before the end of the serving time interval (i.e. between the initial time and the end of the serving time interval).

In an embodiment, the at least one signal communication is associated with a radio link reconnection procedure.

In an embodiment, the initial time is adjusted by the propagation delay between the wireless terminal and the wireless network node.

In an embodiment, the assistance information comprises the propagation delay. As an alternative, the assistance information comprises the ephemeris of the airborne platform or the flying platform of the serving cell and the wireless terminal determines the propagation delay based on the ephemeris of the airborne platform or the flying platform of the serving cell.

Figure 12:
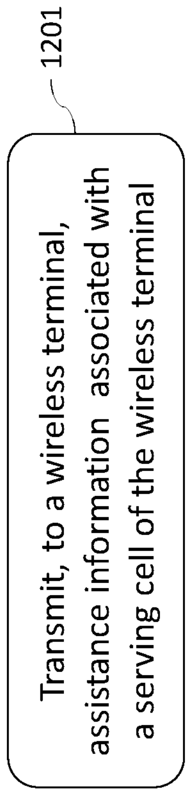
FIG. 12 shows a flowchart of a process according to an embodiment of the present disclosure.

FIG. 12 shows a flowchart of a process according to an embodiment of the present disclosure. The process shown in FIG. 12 may be used in a wireless network node (e.g. BS) and comprises the following steps:

Step 1201: Transmit, to a wireless terminal, assistance information associated with a serving cell of the wireless terminal.

In the process shown in FIG. 12, the wireless network node transmits assistance information associated with a serving cell of the wireless terminal (e.g. UE) to the wireless terminal, for allowing the wireless terminal to accordingly disable at least one measurement and/or adjust measurement configuration and/or disable/delay at least one signal communication. In an embodiment, the assistance information may relate to an airborne platform or a flying platform (e.g. satellite, drone or balloon) of the serving cell.

In an embodiment, the assistance information comprises at least one of:

- a serving time interval,
- an ephemeris of an airborne platform or a flying platform of the serving cell,
- a location of a reference point,
- a distance threshold corresponding to the serving cell,
- an elevation angle from the reference point to the airborne platform or the flying platform of the serving cell,
- an elevation threshold corresponding to the serving cell,
- a propagation delay between the wireless terminal and the wireless network node,
- at least one time offset between a propagation delay of the serving cell and each of at least one propagation delay of at least one neighboring cell,
- at least one frequency gap between a Doppler shift of the serving cell and each of at least one Doppler shift at least one neighboring cell,
- an adjustment triggering time of adjusting the measurement configuration,
- a plurality of periods corresponding to a measurement gap of performing the at least one measurement, or
- an initial time of disabling or delaying the at least one signal communication based on the assistance information.

In an embodiment, the wireless network node further transmits an indication of disabling at least one measurement to the wireless terminal.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as “first,” “second,” and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a wireless terminal, the wireless communication method comprising:

receiving, from a wireless network node, assistance information associated with a serving cell of the wireless terminal, wherein the assistance information comprises a location of a reference point and a distance threshold corresponding to the serving cell, and canceling at least one measurement based on the assistance information when a distance between the reference point and the wireless terminal is smaller than the distance threshold;

wherein the assistance information comprises an ephemeris of an airborne platform or a flying platform of the serving cell and the wireless terminal determines a propagation delay based on the ephemeris of the airborne platform or the flying platform of the serving cell.

2. The wireless communication method of claim 1, wherein the assistance information comprises:

a serving time interval.

3. The wireless communication method of claim 2, wherein the serving time interval is adjusted by a propagation delay between the wireless terminal and the wireless network node.

4. The wireless communication method of claim 1, wherein the assistance information comprises the propagation delay between the wireless network node and the wireless terminal.

5. The wireless communication method of claim 1, wherein the at least one measurement is associated with at least one of a handover procedure, a radio link failure or a beam management procedure.

6. The wireless communication method of claim 1, wherein the at least one measurement comprises at least one of:

receiving at least one reference signal of the at least one measurement, monitoring at least one reference signal of the at least one measurement, calculating at least one measurement result of the at least one measurement, reporting at least one measurement result of the at least one measurement, or triggering at least one measurement event.

7. The wireless communication method of claim 1, further comprising:

receiving, from the wireless network node, an indication of canceling the at least one measurement based on the assistance information.

8. The wireless communication method of claim 1, wherein the assistance information comprises a serving time interval.

9. A wireless communication method for use in a wireless network node, the wireless communication method comprising:

transmitting, to a wireless terminal, assistance information associated with a serving cell of the wireless terminal, wherein the assistance information comprises a location of a reference point and a distance threshold corresponding to the serving cell;

wherein the assistance information comprises an ephemeris of an airborne platform or a flying platform of the serving cell and the wireless terminal determines a propagation delay based on the ephemeris of the airborne platform or the flying platform of the serving cell.

10. The wireless communication method of claim 9, wherein the assistance information comprises:

a serving time interval.

11. The wireless communication method of claim 9, wherein the assistance information comprises a serving time interval, wherein the serving time interval is adjusted by the propagation delay between the wireless terminal and the wireless network node.

12. The wireless communication method of claim 9, wherein the assistance information comprises a the propagation delay between the wireless terminal and the wireless network node.

13. The wireless communication method of claim 9, further comprising:

transmitting, to the wireless terminal, an indication of canceling at least one measurement based on the assistance information.

14. The wireless communication method of claim 13, wherein the at least one measurement is associated with at least one of a handover procedure, a radio link failure or a beam management procedure.

15. The wireless communication method of claim 13, wherein the at least one measurement comprises at least one of:

receiving at least one reference signal of the at least one measurement, monitoring at least one reference signal of the at least one measurement, calculating at least one measurement result of the at least one measurement, reporting at least one measurement result of the at least one measurement, or triggering at least one measurement event.

16. A wireless terminal, comprising:

at least one processor, and a memory, which is configured to store at least one program;

wherein the at least one program, when executed by the at least one processor, enables the at least one processor to:

receive, from a wireless network node, assistance information associated with a serving cell of the wireless terminal, wherein the assistance information comprises a location of a reference point and a distance threshold corresponding to the serving cell, and cancel at least one measurement based on the assistance information when a distance between the reference point and the wireless terminal is smaller than the distance threshold.

17. The wireless terminal of claim 16, wherein the assistance information comprises:

a serving time interval.

18. A wireless network node, comprising:

at least one processor, and a memory, which is configured to store at least one program;

wherein the at least one program, when executed by the at least one processor, enables the at least one processor to:

transmit, to a wireless terminal, assistance information associated with a serving cell of the wireless terminal, wherein the assistance information comprises a location of a reference point and a distance threshold corresponding to the serving cell, wherein the assistance information comprises an ephemeris of an airborne platform or a flying platform of the serving cell and the wireless terminal determines a propagation delay based on the ephemeris of the airborne platform or the flying platform of the serving cell.

19. The wireless network node of claim 18, wherein the assistance information comprises:

a serving time interval.

* * * * *